(12) United States Patent
Kagawa et al.

(10) Patent No.: US 6,400,677 B2
(45) Date of Patent: *Jun. 4, 2002

(54) HIGH RECORDING DENSITY OPTICAL DISC

(75) Inventors: Masaki Kagawa; Jun Nakano, both of Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/039,222

(22) Filed: Mar. 16, 1998

(30) Foreign Application Priority Data

Mar. 17, 1997 (JP) ................................ 9-063628

(51) Int. Cl.$^7$ ................................ G11B 7/24
(52) U.S. Cl. ................................ 369/275.4
(58) Field of Search ................................ 369/275.4, 275.1, 369/13, 110, 109, 277, 280, 13.55, 109.02; 365/122, 215

(56) References Cited

U.S. PATENT DOCUMENTS

| 5,414,652 A | * | 5/1995 | Mieda et al. ................. 365/122 |
| 5,553,051 A | * | 9/1996 | Sugiyama et al. ...... 369/109.02 |
| 5,694,379 A | * | 12/1997 | Aratani et al. ........... 369/13.55 |

FOREIGN PATENT DOCUMENTS

| EP | 0 777 216 A2 | 6/1997 |
| EP | 0 825 590 A2 | 2/1998 |

OTHER PUBLICATIONS

Patent Abstracts of Japan, vol. 096, No. 009, Sep. 30, 1996 and JP-A 08 124220A (NEC Corp.), May 17, 1996.
Patent Abstracts of Japan, vol. 096, No. 004, Apr. 20, 1996 and JP-A-07 320288A (Sharp Corp.), Dec. 8, 1995.

* cited by examiner

Primary Examiner—Ali Neyzari
(74) Attorney, Agent, or Firm—Sonnenschein, Nath & Rosenthal

(57) ABSTRACT

An optical disc comprising a recording layer upon which a groove and land are formed for recording a data signal upon both the groove and the land, and further wherein both of the groove and the land have substantially identical recording characteristics.

4 Claims, 7 Drawing Sheets

HIGH RECORDING DENSITY OPTICAL DISC

BACKGROUND OF THE INVENTION

1. Field of the Invention

The present invention relates to an optical disc and in particular, to an optical disc having a land portion and groove portion, on both of which recording is carried out.

2. Description of the Prior Art

In the field of information recording, various groups are studying on the optical information recording method. This optical information recording method have a variety of merits, enabling to record and reproduce in a non-contact state and to obtain a high recording density than in a magnetic recording method by ten times or more, coping with various memory forms. The optical information recording method has been widely spread in practice for industrial use and civil use as a method enabling to realize a low-cost large-capacity file.

As a recording medium of reproduction-dedicated type, there are widely spread a digital audio disc on which a music information is recorded and an optical video disc on which a video information is recorded. Moreover, as a recording medium of writable type, there are spread a magneto-optical disc and an optical disc of phase change type.

There have been suggested various methods to increase the density of these optical discs. As one of these methods, there is an approach to record a data bn each of a land portion and a groove portion of a disc so as to realize a high density.

Normally, on an optical disc substrate is formed a continuous groove in a spiral form or coaxial form and a land formed between grooves. Conventionally, a data signal is recorded on either of the land portion or the groove portion as a recording track of the optical disc. This is because if recording is carried out on both of the land portion and the groove portion, a cross talk is caused, i.e., a signal is read from an adjacent track when reproducing an information.

However, from the viewpoint of recording density increase, it is by far more advantageous to utilize both of the land portion and the groove portion for recording a data signal. Consequently, Japanese Patent Application 5-282705 discloses an optical disc in which both of a land and a groove are used as tracks for recording by setting a groove depth Gd in the vicinity of $\lambda/6n$ (wherein $\lambda$ represents a laser wavelength used for data reproduction and n represents a refraction index of the substrate). Hereinafter, this method will be referred to as a land/groove method. In an optical disc having a groove depth Gd set to satisfy the aforementioned condition, when reproducing the groove, for example, even if a laser beam is radiated to an adjacent land, cross talk from the land can be suppressed to a extremely small value. The same applies to a case when the relationship between the land and the groove is reversed.

In the optical disc of the aforementioned land/groove method, a groove and land are formed on a substrate so as to have an almost identical width and a recording layer is formed on the groove and land thus formed.

However, this optical disc of the land/groove method has a problem that optical characteristics and other conditions differ between the land and the groove, disabling to carry out a preferable land/groove recording.

SUMMARY OF THE INVENTION

It is therefore an object of the present invention to provide an optical disc of the land/groove method in which optical characteristics and other conditions are equivalent in the land and the groove, which can be preferably used to carry out a preferable land/groove recording.

In order to achieve the aforementioned object, the inventor of the present invention studied on an optical disc appropriate for land/groove recording and found the cause of the aforementioned problem in the conventional land/groove type optical disc, i.e., different optical characteristics between the land and the groove formed on the recording layer. By removing the cause, the inventor has reached the present invention.

The land/groove type optical disc is prepared by forming a land and a groove so as to have an identical width on a transparent substrate made from polycarbonate or the like on which a recording layer is formed. A signal recording and reproducing is carried out by applying a laser beam from the surface of the disc not having the recording layer, and the laser beam is scattered and diffracted depending on the configurations of the land and the groove formed on the recording layer.

As shown in FIG. 1, in a conventional land/groove type optical disc, the recording layer formed on the slanting portion of the groove has a slightly thinner thickness and the groove formed on the substrate is half-filled with the recording layer, resulting that the groove formed on the recording layer has a smaller width than that of the land. Thus, even if the land and the groove of an identical width are formed on the substrate, the groove and the land formed on the recording layer have different width values and different optical characteristics.

In order to obtain identical optical characteristics between the land and the groove in the land/groove type optical disc, it is necessary that the land and the groove formed on the recording layer have approximately identical width.

Consequently, the present invention provides an optical disc having a substrate on which a groove and a land are formed so that a data signal is recorded on both of the land and the groove portions, the optical disc being characterized in that the groove formed on the substrate has a greater width than the land formed on the substrate and at least a recording layer is formed on the substrate where a data signal is recorded.

Furthermore, the inventor of the present invention used a typical schematic figure showing correspondence between the configurations of the substrate and the reflection film surface, so as to create an approximate expression which determines the optimal substrate configuration, and checked various optical discs to verify this approximate expression.

Firstly, as the typical schematic figure, the inventor used an optical disc as shown in FIG. 1 having a substrate on which a recording layer is formed.

Here, Wg represents an average width of a groove formed on the substrate; Wl, an average width of a land formed on the substrate; Tg, a film thickness of a recording layer formed on the slanting portion of the groove formed on the substrate; To, a film thickness of the recording layer formed on the flat portion of the groove formed on the substrate; θ, an angle determined by the slanting portion and the flat portion of the groove formed on the substrate; and Tp, a sum of the average width Wg of the groove and average width Wl of the land formed on the substrate. As shown in FIG. 1, a groove formed on the recording layer after film formation has an average width smaller by $2\Delta$ than the average value Wg of the groove formed on the substrate and as a result, a land formed on the recording layer after film formation has an average width greater by this value.

In the land/groove method, it is necessary that the groove formed on the recording layer after film formation have almost identical value as the average width of the land. Consequently, the following relationship should be satisfied.

$$Wg-2\Delta=W1+2\Delta \qquad (2)$$

If the track pitch is assumed to be Tp, then Tp=Wg+W1. This can be introduced into the Expression (2) to obtain the following expression.

$$Wg=0.5Tp+2\Delta \qquad (3)$$

If the θ is the angle determined by the slanting portion and the flat portion of the groove formed on the substrate, the Δ can be expressed as follows.

$$\Delta=(Tg-To)/\tan\theta \qquad (4)$$

Thus, if the θ and the Tg are known, the Wg value as the design target can be determined.

The value of theta can be defined by the following expression, assuming Ge as the width of the groove formed on the slanting portion and Gd as the depth of the groove formed on the substrate.

$$\theta=\tan^{-1}(Gd/Ge) \qquad (5)$$

The values of Ge and Gd can be easily obtained from an AFM photograph, for example. Moreover, the Tg can be measured by taking a tomograph. As has thus far been described, the expression (3) was obtained for designing an optimal substrate for the land/groove method.

In the recording layer of a recording/reproduction optical disc, a dielectric film is formed so as to have a greatest thickness. The dielectric film is generally formed by way of the RF sputtering. In this process, for example, molecules contributing to form a film at a certain position are coming from various directions around that position. FIG. 2 shows a film formation model by the RF sputtering on a flat surface. At a certain position on the flat surface, particles coming from a hemispherical area are accumulated to form a film of thickness To.

On the other hand, FIG. 3 shows a film formation model by way of the RF sputtering on a slanting surface. As shown in FIG. 3, a volume corresponding to the leftward angle θ does not contribute to film formation at that position. On the contrary, there are particles which come from the lower right in the figure. However, the particle amount coming from the lower right is smaller than the particles obstructed. As a result, the thickness Te of the recording layer in the perpendicular direction with respect to the groove slanting portion of the substrate can be interpreted to be thinner than the To. If the particle amount coming from the lower right is taken into consideration and a constant α is introduced, the Te can be expressed approximately by the following expression. Note that the unit of θ in the expression is radian.

$$Te=(P-\alpha\theta)To/\pi \qquad (6)$$

The α is a constant in a range of $0\leq\alpha\leq1$ depending on a film formation apparatus. This coefficient can be determined by repeatedly taking tomographs of the film formation substrate. This value was found to be 0.66 in the film formation apparatus actually used in the experiment.

Furthermore, from FIG. 1, the following expression can be obtained.

$$Tg=Te/\cos\theta \qquad (7)$$

As has been described above, by determining the coefficient α in advance by the tomographs, the Tg can be calculated approximately from the Expressions (6) and (7).

Moreover, in general, the optical disc specification allows a fluctuation of about ±12% from a reference value for the reflection ratio fluctuation on the disc surface. In the land/groove method, if one of the land and the groove formed on the recording layer has a greater width, then the other has a smaller width, and the reflection ratio is changed. For this, it is considered that, corresponding to the allowance of the reflection ratio over the optical disc surface, there is an allowance for the width fluctuation of the groove and land. This allowance should be determined.

For this, a numerical experiment was carried out for the relationships between the fluctuation of the width of a rectangular groove formed on the recording layer and the reflection ratios of the land and the groove. FIG. 4 shows the results of this experiment. For the numerical experiment, Fourier analysis was used.

Here, the vertical axis represents the reflection ratio normalized by assuming 1 when the land and the groove formed on the recording layer have an identical width. Moreover, the horizontal axis represents the groove width fluctuation amount with respect to the track pitch normalized by assuming 0 when the aforementioned land and groove have an identical width.

As shown in FIG. 4, when the width of the groove formed on the substrate fluctuates, the reflection ratios of the groove and land formed on the recording layer also fluctuate proportionally. As a result of checking three patterns: Tp 1.4 μm and λ680 nm; Tp 1.6 μm and λ680 nm; and Tp 1.6 μm and λ780 nm (A/W=(1.1) in all the three cases), it can be said that the tendencies are matched with one another.

Furthermore, when the reflection ratio fluctuation allowance is limited to ±10%, as shown in FIG. 4, the groove width fluctuation amount can be allowed by about ±4% with respect to the track pitch. Consequently, the average width Wg of the groove formed on the substrate is preferably in the range defined by the following Expression (1).

$$0.46TP+2\Delta \leq Wg \leq 0.54TP+2\Delta \qquad (1)$$

wherein $\Delta=(Tg-To)/\tan\theta$

It should be noted that the verification of the aforementioned Expression (3) will be described later.

In the optical disc having the aforementioned configuration according to the present invention, as the groove formed on the substrate is designed so as to have a greater width than the land formed on the substrate, it is possible that when a portion of the groove formed on the substrate is filled with a film formation, the groove and the land formed on the recording layer have an almost identical width, which enables to obtain equivalent optical characteristics for the land and the groove, enabling to be employed in the land/groove method.

Furthermore, by making the average width Wg of the groove formed on the substrate greater than the width of the land formed on the substrate so as to satisfy the aforementioned Expression (1), it is possible to maintain the reflection ratio fluctuation within the allowable range and make identical the width of the groove and the land formed on the recording layer, enabling to effectively design a substrate exhibiting identical optical characteristics for the land and the groove which can be preferably used in the land/groove method.

DETAILED DESCRIPTION OF THE PREFERRED EMBODIMENTS

Hereinafter, description will be directed to embodiments of the present invention with reference to the attached drawings.

Figure 5:
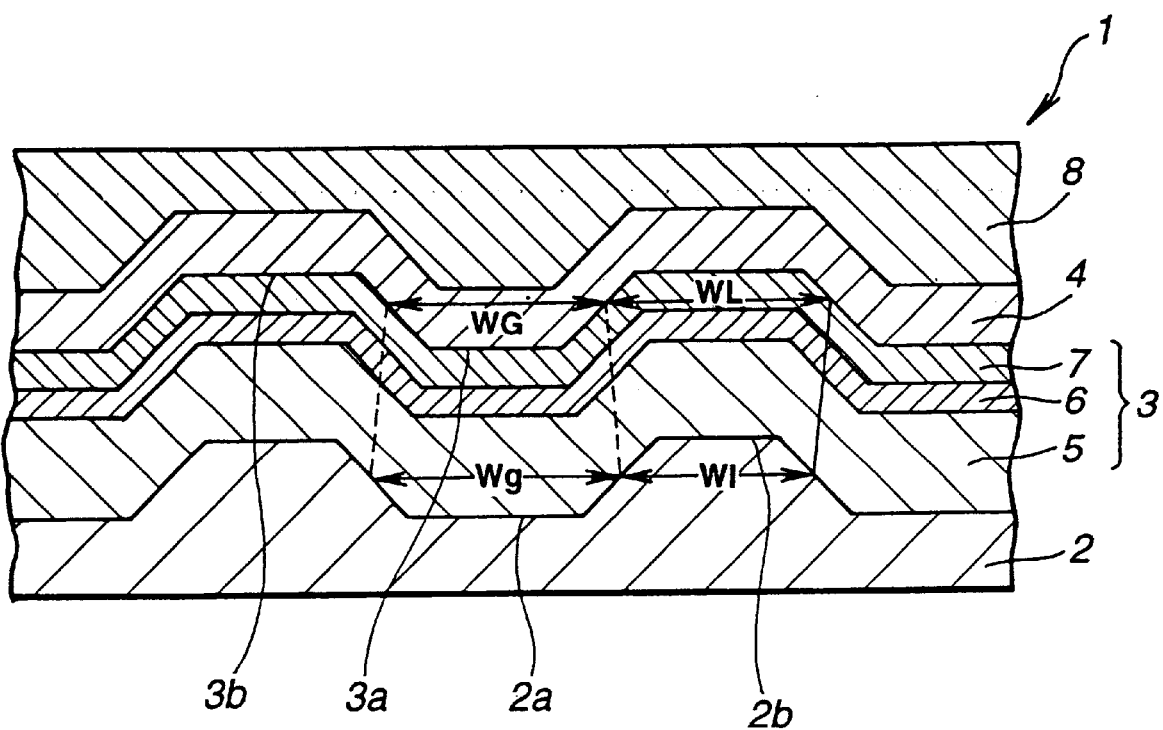
FIG. 5 is a cross-sectional view showing an example of an optical disc according to the present invention.

FIG. 5 shows an optical disc 1 according to the present invention, including a substrate 2 on which a recording layer 3, a reflection film 4, and t a protection layer are layered in this order.

As shown in FIG. 5, the substrate 2 has a groove 2a which is a concave portion and a land 2b which is a convex portion. In the optical disc 1 according to the present invention, the groove formed on the substrate 2 has an average width Wg which is greater than an average width W1 of the land formed on the substrate. Furthermore, it is preferable that the average width Wg of the groove formed on the substrate 2 satisfy the following Expression (1).

$$0.46TP+2\Delta \leq Wg \leq 0.54TP+2\Delta \quad (1)$$

wherein $\Delta=(Tg-To)/\tan \theta$.

The recording layer 3, as shown in FIG. 5, includes a first dielectric film 5, a recording film 6, and a second dielectric film 7 which are layered in this order so as to cover the substrate 2. Moreover, a data signal is recorded in this recording layer 3. The recording layer 3 has a groove 3a and a land 3b formed on the side of the reflection film 4 corresponding to the groove 2a and the land 2b formed on the substrate 2, so as to constitute a read surface. In the optical disc 1 according to the present invention, the groove 3a has an average width WG which is almost identical to the average width WL of the land 3b formed on this recording layer 3 after film formation.

Figure 1:
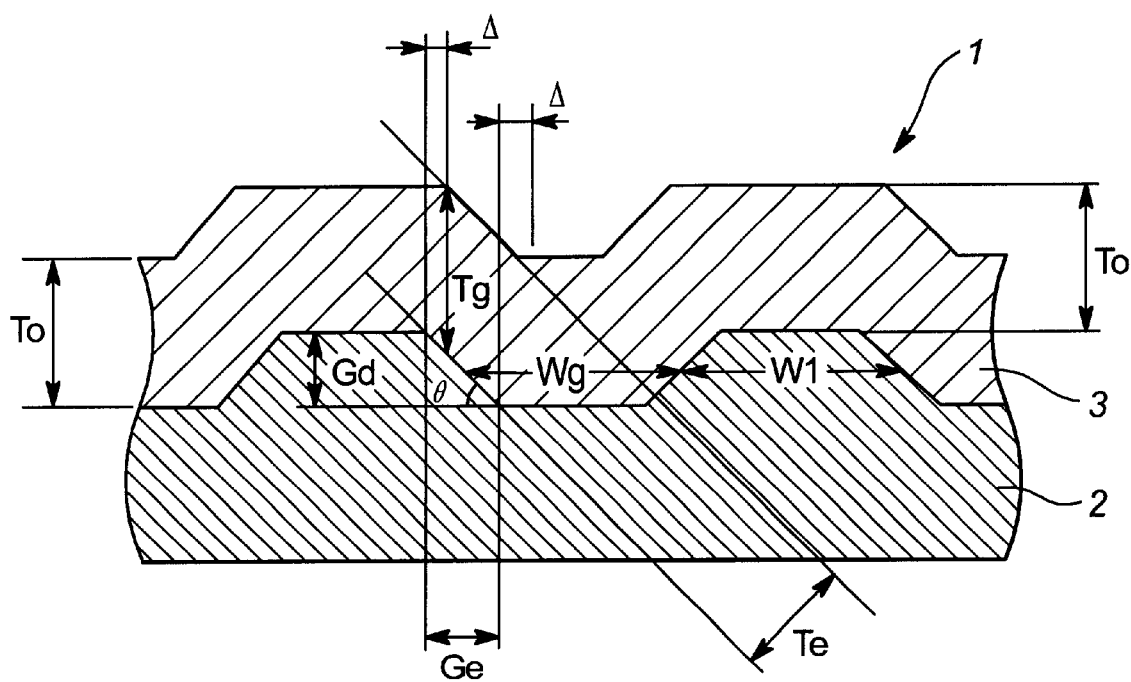
FIG. 1 is a cross-sectional view showing an example of an optical disc having a land and a groove formed on a substrate and on a recording layer.
Figure 2:
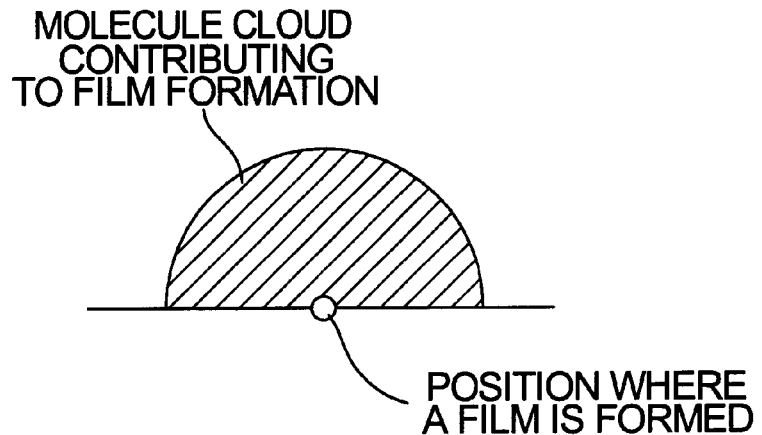
FIG. 2 shows a film formation by RF sputter on a flat surface.
Figure 3:
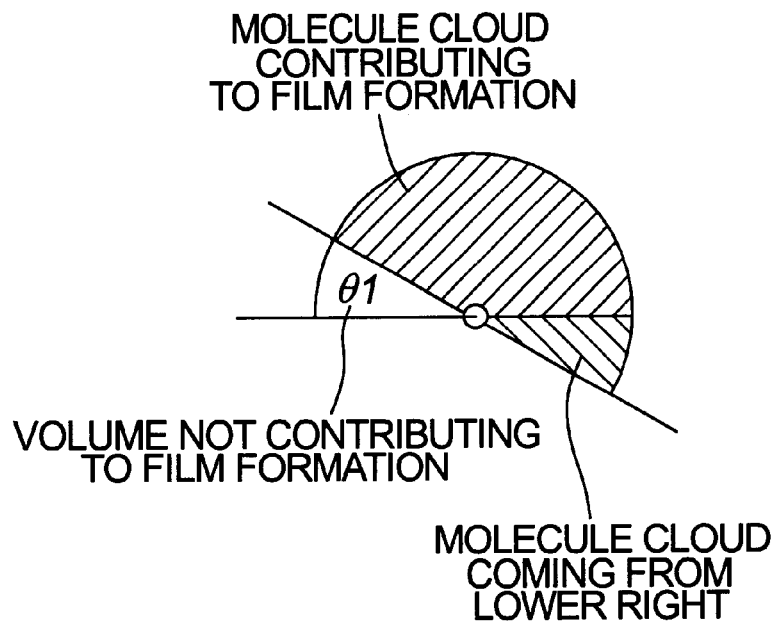
FIG. 3 shows a film formation by RF sputter on a slanting surface.
Figure 4:
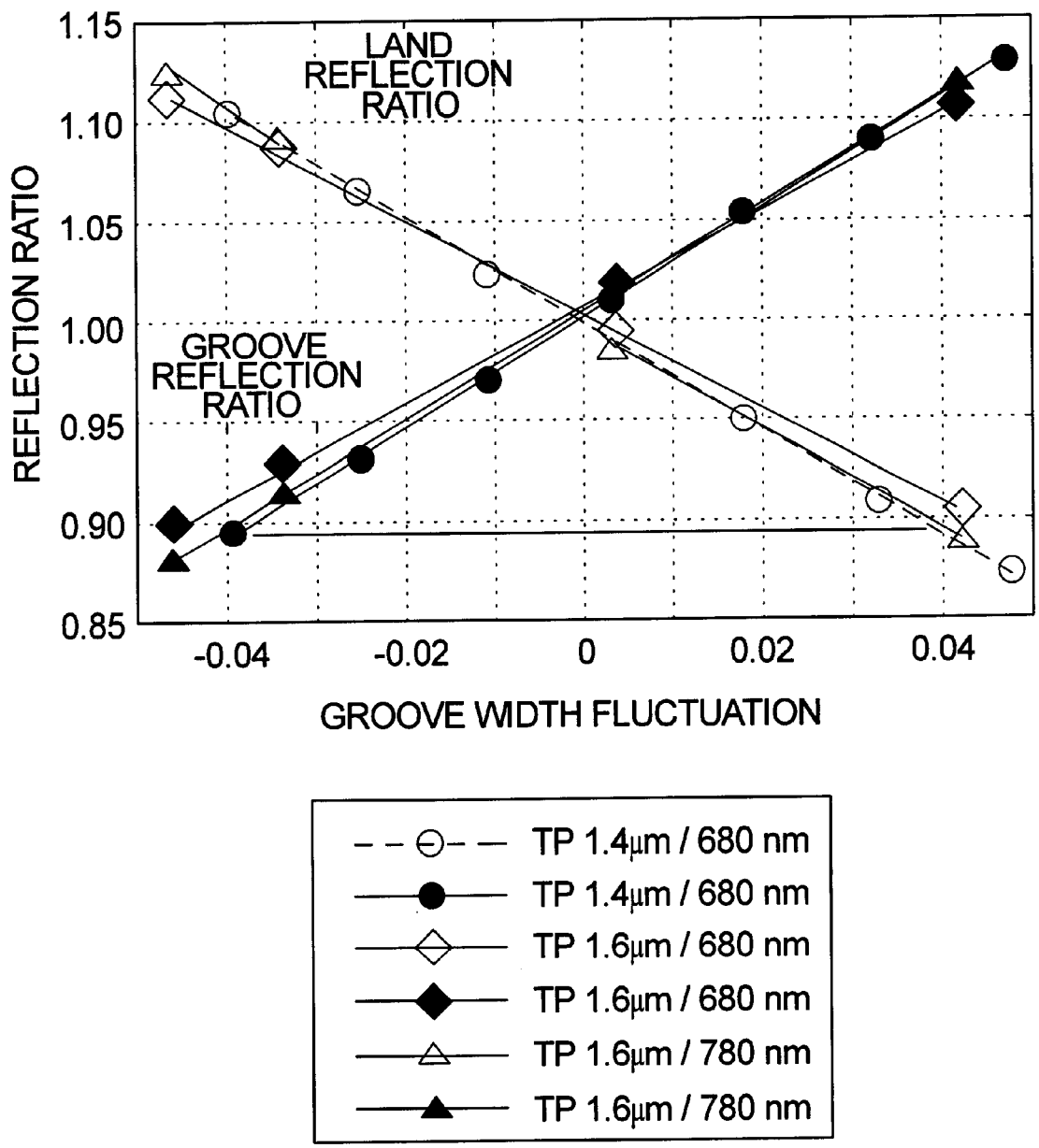
FIG. 4 is a diagram showing relationships between a groove width fluctuation amount and a reflection ratio of a land and a groove in a numerical experiment.

Here, as shown in FIG. 1, the Wg represents an average width of the groove 2a formed on the substrate 2. The Tg represents a film thickness of the recording layer 3 formed on the slanting portion of the groove 2a formed on the substrate 2. The To represents a film thickness of the recording layer 3 formed on the flat portion of the groove 2a formed on the substrate 2. The Te represents a film thickness of the recording layer formed on the slanting portion of the groove 2a formed on the substrate 2 in the perpendicular direction with respect to the slanting portion. The Gd represents a film thickness of the land 2b formed on the substrate 2, in other words, a depth of the groove 2a. The Ge represents a width of the slanting portion of the groove 2a. Moreover, the 2Δ indicates a difference between the width of the groove 3a of the recording layer 3 and the groove 2a formed on the substrate 2.

Moreover, the θ indicates an angle defined by the slanting portion and the flat portion of the groove 2a formed on the substrate 2. In the present invention, a large effect can be obtained when this theta is remarkably large, especially effective when the θ is 45° or above.

In order to verify the following Expression (3), the depth Gd of the groove 2a formed on the substrate 2 was changed, maintaining the average width WG of the groove almost identical with the average width WL of the land formed on the recording layer 3 facing the reflection film 4 after film formation almost identical, and the average width Wg of the groove 2a formed on the substrate 2 was measured. FIG. 5 shows the values obtained in this measurement and the values calculated by the Expression (3).

Here, only the Gd was changed while Tp was fixed to 0.85 μm, Ge was fixed to 0.07 μm, and the To was fixed to 200 nm. The calculation method using the Expression (3) is as follows.

$$Wg=0.5Tp+2\Delta \quad (3)$$

$$\Delta=(Tg-To)/\tan \theta \quad (4)$$

$$\theta-=\tan^{-1}(Gd/Ge) \quad (5)$$

$$Te=(\pi-\alpha\theta)To/\pi \quad (6)$$

$$Tg=Te/\cos \theta \quad (7)$$

Firstly, from the Expression (5), the aforementioned Ge and Gd were substituted to obtain the θ. This θ value was introduced into the Expression (6) and To was introduced to calculate the Te. Next, the Te calculated from the θ and Expression (6) was introduced to Expression (7) to calculate the Tg. Then, the θ, Tg, and To were introduced into the Expression (4) to calculate Δ. Next, the fixed Tp and the calculated Δ were introduced into the Expression (3) to obtain the Wg, serving as the calculated value.

Figure 6:
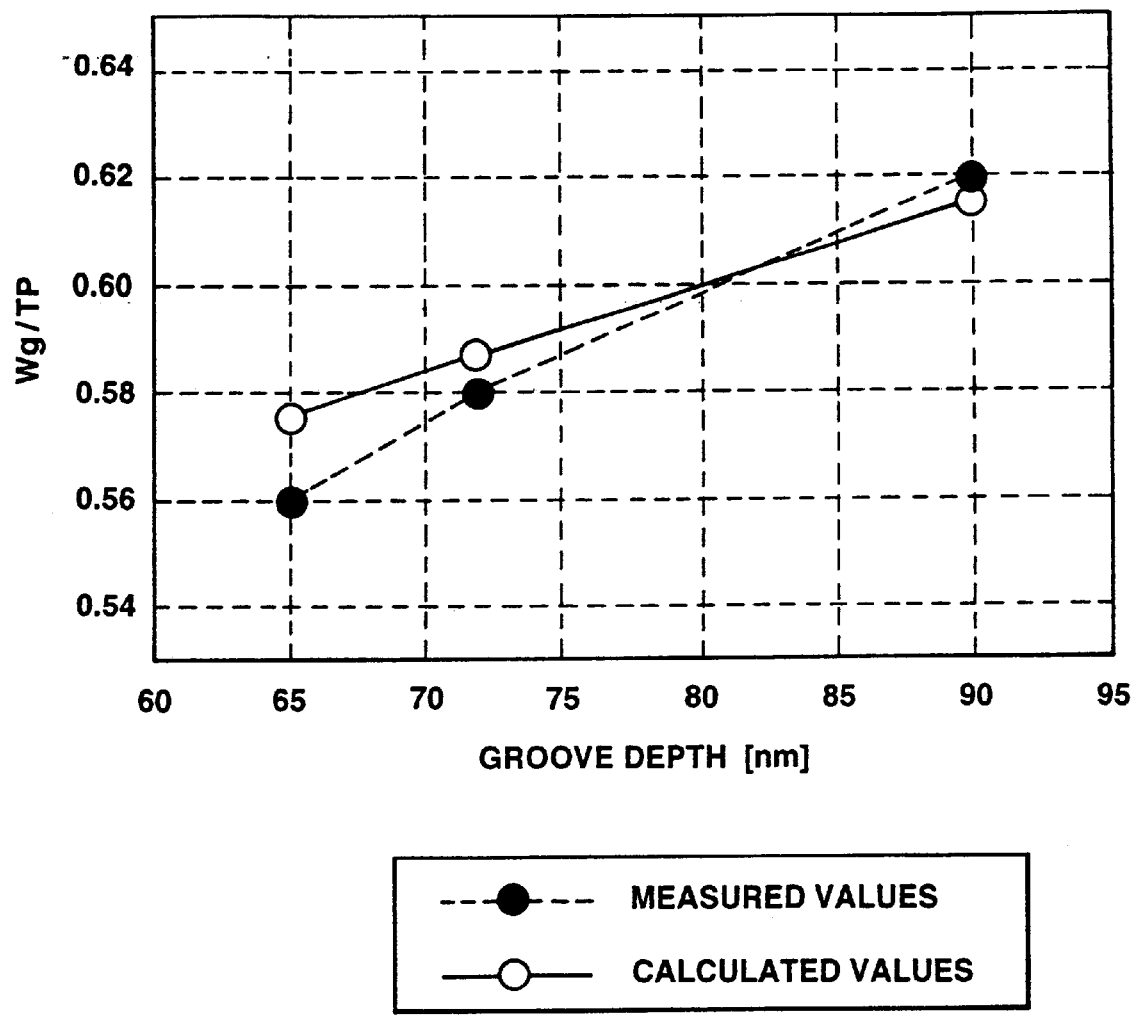
FIG. 6 is a diagram showing the relationship between the groove average width Wg and the groove depth Wd through measurement values and calculated values.

As shown in FIG. 6, a difference between the Wg as the measured value in the experiment and the Wg as the calculated value, i.e., an error was within an order of several percents, which shows the adjustability of the Expression (3).

Moreover, from this, by using the value calculated by Expression (3) for the average width Wg of the groove 2a to be formed on the substrate 2, it is possible to make the average width Wg of a groove almost identical with the average width WL of a land formed on the recording layer 3.

Furthermore, as has been described above, in order to limit the reflection ratio fluctuation within the allowance of ±10%, as shown in FIG. 5, it is necessary that the average width Wg of the groove 2a formed on the substrate 2 be normalized with the track pitch with an allowance of ±4%.

Therefore, from the aforementioned result, i.e., ±4% of allowance for the fluctuation of the average width Wg of the groove 2a formed on the substrate 2 and from the aforementioned Expression (3), the following Expression (1) can be obtained.

$$0.46TO+2\Delta \leq Wg \leq 0.54TP+2\Delta \quad (1)$$

Normally, as the material for the optical disc substrate 2, a polycarbonate resin and methacrylic resin are mainly used. Furthermore, as a material having a preferable thermal characteristic, denaturated polycarbonate resin is used. Besides, there can be exemplified a plastic material such as an acrylic resin, polyolefin resin, and epoxy resin as well as a glass material.

The recording layer 3 is made by the first dielectric film 5 formed on the substrate 5, the aforementioned recording film 6 formed on the first dielectric film 5, and the second dielectric film 7 formed on the aforementioned recording film 6.

As the material for the recording film 6 constituting the recording layer 3, in the case of a magneto-optical disc, TbFeCo material and the like can be used; and in the case of a phase change type disc, it is possible to use TeGeSe, TeSe, InSe, SiTeSn, TeGeSb materials and the like. This recording film 6 preferably has a thickness of 20 nm to 24 nm for the magneto-optical disc and 20 nm to 30 nm for the phase change type magnetic disc.

As the material for the first and the second dielectric films 5 and 7, it is possible to use SiN and the like for the magneto-optical disc and AnS—SiO$_2$ and the like for the phase change type magnetic disc. The first dielectric film 5 preferably has a thickness of 80 nm to 110 nm for the magneto-optical disc and 100 nm to 120 nm for the phase change type optical disc.

The second dielectric film 7 preferably has a thickness of 30 nm to 40 nm for the magneto-optical disc and 20 nm to 30 nm for the phase change type optical disc.

The reflection film 4 is formed on the aforementioned recording layer 3. This reflection film 4 preferably has a thickness of 50 nm to 70 nm for the magneto-optical disc and 70 nm to 110 nm for the phase change type optical disc.

The protection layer 8 is formed on the aforementioned reflection film 4. This protection layer 8 can be made from a material such as a ultraviolet ray setting type resin.

Figure 7:
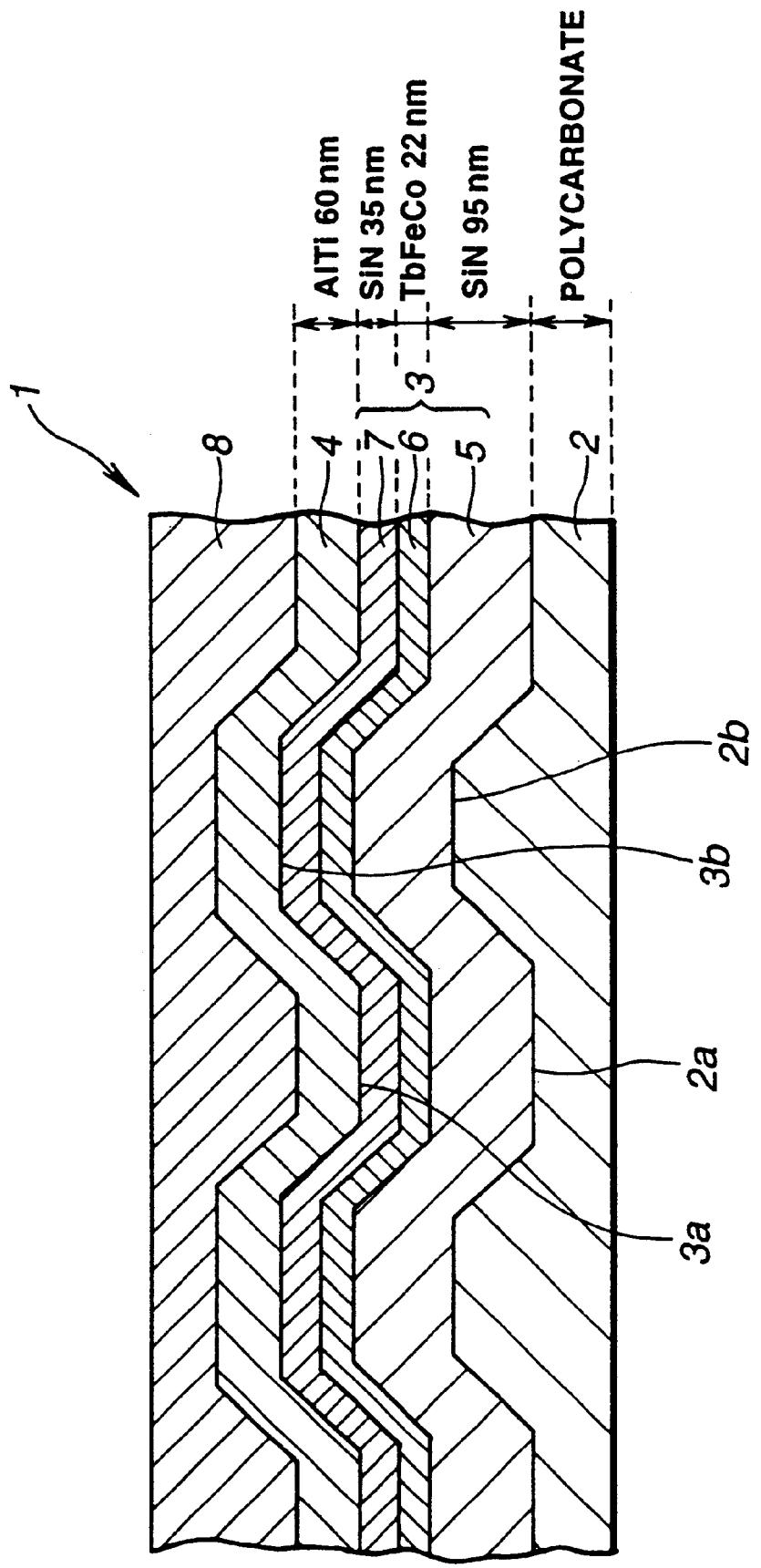
FIG. 7 is a cross-sectional view showing a magneto-optical disc according to the present invention.
Figure 8:
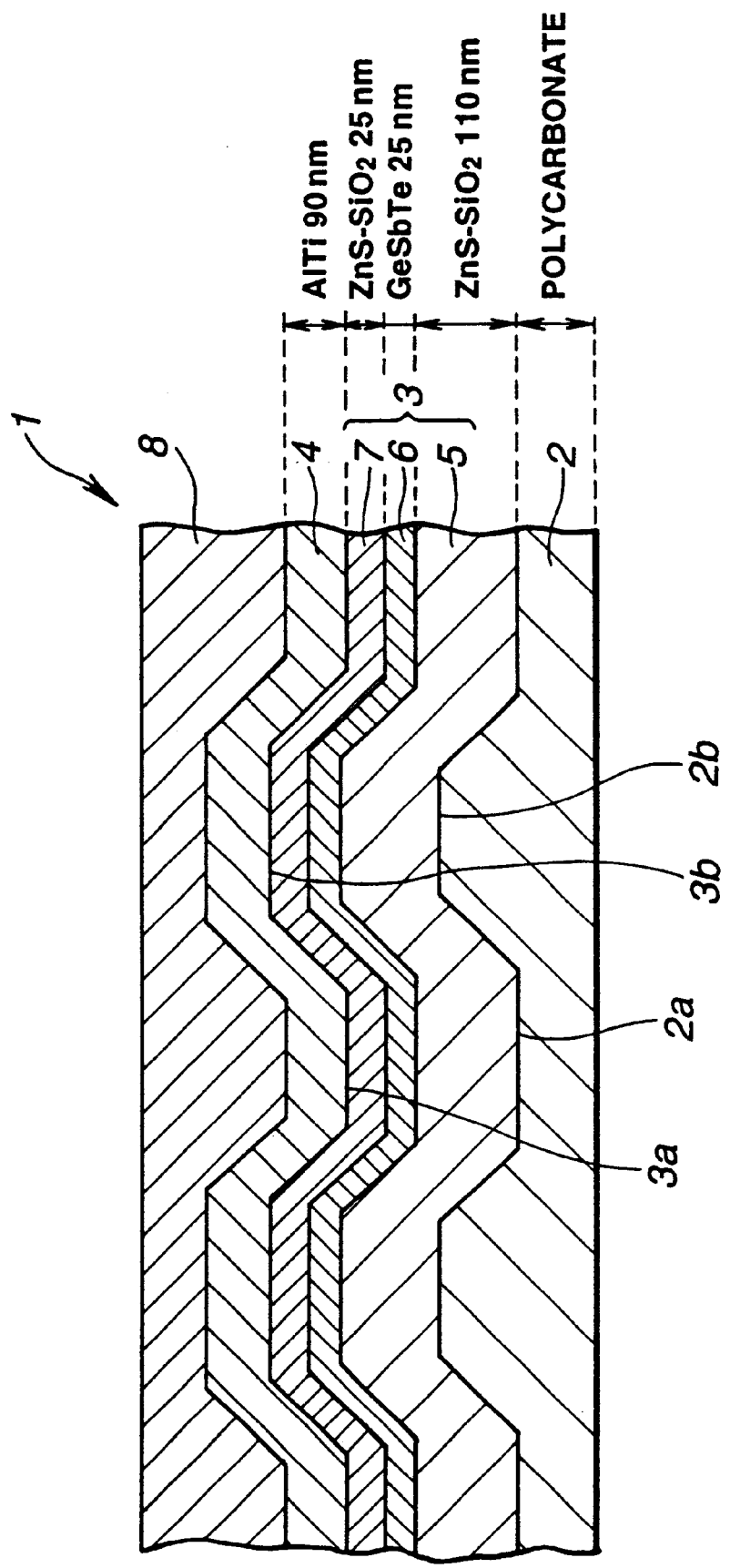
FIG. 8 is a cross-sectional view showing an example of an optical disc of the phase change type according to the present invention.

The optical disc 1 having the aforementioned configuration according to the present invention can be applied to a magneto-optical disc as shown in FIG. 7 and a phase change type optical disc as shown in FIG. 8.

The magneto-optical disc according to an embodiment of the present invention, as shown in FIG. 7, includes a substrate 2 made from a polycarbonate having a reflection index (n) of 1.58, on which are formed a first dielectric film 5 from SiN with a thickness of 95 nm, a recording film 6 from TbFeCo with a thickness of 22 nm, a second dielectric film 7 from SiN with a thickness of 35 nm, and a reflection film 4 from AlTi with a thickness of 60 nm which are successively layered in this order.

On the other hand, here, it is assumed that the Tp is 1.4 μm, To is 152 nm, Gd is 70 nm, Ge is 70 nm, an α is 0.66.

Furthermore, according to the Expressions (1) to (7), it is assumed that θ is 45°, Tg is 127 nm, Δ is 25 nm, and Wg is 0.750 μm.

The aforementioned magneto-optical disc according to the embodiment was prepared using the Wg value calculated from the Expressions (1) to (7) so that the average width WG of the groove 3a and the average width WL of the land 3b formed on the recording film 3 are approximately identical. This magneto-optical disc with the land and the groove having equivalent optical characteristics serves as an optimal magneto-optical disc for the land/groove method.

The phase change type disc according to an embodiment of the present invention, as shown in FIG. 8, includes a substrate made from a polycarbonate having a reflection index (n) of 1.58, on which are formed a first dielectric film 5 from SiN with a thickness of 110 nm, a recording film 6 from GeSbTe with a thickness of 160 nm, a second dielectric film 7 from SiN with a thickness of 25 nm, and a reflection film 4 from AlTi with a thickness of 90 nm which are successively layered in this order.

Here, it is assumed that Tp is 1.4 μm, To is 160 nm, Gd is 70 nm, Ge is 70 nm, and α is 0.66.

According to the Expressions (1) to (7), it is assumed that Th is 45°, Tg is 134 nm, D is 26 nm, and Wg is 0.752 μm.

The aforementioned phase change type optical disc according to the embodiment was prepared with the Wg value calculated from the Expressions (1) to (7) so that the average width WG of the groove 3a and the average width WL of the land 3b formed on the recording film 3 are almost identical. In this phase change type optical disc, the land and the groove have equivalent optical characteristic, serving as an optimal phase change type optical disc in the land/groove method.

As has been described above, as the optical disc 1 according to the present invention can be realized as a magneto-optical disc and a phase change type optical disc.

As has thus far been described, in an optical disc according to the present invention including a substrate having a groove portion and a land portion on both of which a data signal is recorded, the groove formed on the substrate has a width larger than a width of the land formed on the substrate, so that a portion of the groove formed on the substrate is filled by a film formation so as to enable to make a width of a groove formed on the recording layer almost identical with that of a land formed on the recording layer, further enabling to obtain identical optical characteristics for the land and the groove, serving as a preferable optical disc for the land/groove method.

Furthermore, by making the width Wg of the groove formed on the substrate larger than the width of the land formed on the substrate so as to satisfy the Expression 0.46TP+2Δ≦Wg≦0.54TP+2Δ, it is possible to maintain the reflection ratio fluctuation within an allowable range and to make the width of the groove formed on the recording layer almost identical with the width of the land formed on the recording layer, thus enabling to obtain equivalent optical characteristics for the land and the groove. The present invention enables to effectively design such a substrate, reducing the works required for designing and enhancing the productivity.

What is claimed is:

1. An optical disc comprising
    a substrate, said substrate having a first groove portion with a first groove width and a first land portion with a first land width, wherein said first groove width is greater than said first land width; and
    a recording layer, said recording layer having a second groove portion with a second groove width and a second land portion with a second land width on which at least one data signal may be recorded, wherein said second groove width is substantially equal to said second land width.

2. An optical disc as claimed in claim 1, wherein recording of said at least one data signal is carried out by utilizing a phase change of said recording layer.

3. An optical disc as claimed in claim 1, wherein recording of said at least one data signal is carried out by utilizing a magneto-optical effect of said recording layer.

4. An optical disc comprising a substrate layer including groove and land portions and wherein said groove formed on said substrate has an average width Wg defined by Expression (1) as follows:

$$0.46Tp+2\Delta \leq Wg \leq 0.54Tp+2\Delta \quad \ldots \quad (1)$$

$$\Delta = (Tg-To)/\tan\theta:$$

Tg represents a film thickness of the recording layer formed on a slanting portion of said groove formed on said substrate;

To represents a film thickness of said recording layer formed on a flat portion of said groove formed n said substrate;

θ represents an angle defined by said slanting potion said flat portion of said groove formed on said substrate; and Tp represent a sum of the average width Wg of said groove and the average width W1 of said land formed on said substrate.

* * * * *